US011919097B2

(12) United States Patent
Wattenbach et al.

(10) Patent No.: US 11,919,097 B2
(45) Date of Patent: Mar. 5, 2024

(54) RECIPROCATING SAW

(71) Applicant: Milwaukee Electric Tool Corporation, Brookfield, WI (US)

(72) Inventors: Brian Wattenbach, Menomonee Falls, WI (US); Jeffrey Holly, West Bend, WI (US); Benjamin Ludy, Jackson, WI (US); Roger D. Neitzell, Palmyra, WI (US); Thomas R. Bednar, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/589,672

(22) Filed: Oct. 1, 2019

(65) Prior Publication Data

US 2020/0030897 A1 Jan. 30, 2020

Related U.S. Application Data

(60) Division of application No. 15/410,359, filed on Jan. 19, 2017, now Pat. No. 10,464,148, which is a (Continued)

(51) Int. Cl.
*B23D 51/16* (2006.01)
*B23D 49/10* (2006.01)
(Continued)

(52) U.S. Cl.
CPC ............. *B23D 51/16* (2013.01); *B23D 49/10* (2013.01); *B23D 49/165* (2013.01); *F16J 15/3232* (2013.01)

(58) Field of Classification Search
CPC ...... B23D 51/16; B23D 49/10; B23D 49/165; B23D 49/162
See application file for complete search history.

(56) References Cited

U.S. PATENT DOCUMENTS 3,270,369 A 9/1966 Mandell
3,461,732 A 8/1969 Gregory
(Continued)

FOREIGN PATENT DOCUMENTS

DE 3904978 A1 8/1990
DE 10023081 A1 3/2001
(Continued)

OTHER PUBLICATIONS

Search and Examination Report from the United Kingdom Intellectual Property Office for Application No. 1215575.0 dated Oct. 5, 2012 (5 pages).
(Continued)

*Primary Examiner* — Jennifer S Matthews
(74) *Attorney, Agent, or Firm* — Michael Best & Friedrich LLP

(57) ABSTRACT

A reciprocating saw includes a housing assembly and a motor positioned within the housing assembly. The motor includes a pinion. A drive mechanism is positioned within the housing assembly and includes a gear driven by the pinion, a hub coupled to the gear, a spindle, and a connecting rod. A clutch assembly is coupled to the drive mechanism to selectively transmit drive force form the gear to the hub. The clutch assembly includes a first disk coupled to the gear, a second disk coupled to the hub, a biasing member, and a threaded fastener. The biasing member is positioned between the hub and the gear to bias the first and second disks into frictional engagement. The threaded fastener extends through the gear and threadably engages the hub to couple the hub to the gear. Tightening the threaded fastener pulls the hub toward the gear to preload the biasing member.

20 Claims, 11 Drawing Sheets

Related U.S. Application Data continuation of application No. 12/842,209, filed on Jul. 23, 2010, now Pat. No. 9,579,735.

(60) Provisional application No. 61/228,017, filed on Jul. 23, 2009.

(51) Int. Cl.
*B23D 49/16* (2006.01)
*F16J 15/3232* (2016.01)

(56) References Cited

U.S. PATENT DOCUMENTS

| | | | |
|---|---|---|---|
| 3,642,002 A | | 2/1972 | Otterstrom |
| 3,681,940 A | * | 8/1972 | Albrile ................. B41J 11/24 192/70.14 |
| 3,692,403 A | * | 9/1972 | Turner ................. B65H 75/185 399/138 |
| 4,055,890 A | * | 11/1977 | Seibold ................. A01G 3/067 30/240 |
| 4,137,632 A | * | 2/1979 | Pfanzer ................. B23D 49/162 30/393 |
| 4,205,572 A | * | 6/1980 | Weiner ................. F16B 31/028 30/388 |
| 4,280,741 A | | 7/1981 | Stoll |
| 4,372,433 A | * | 2/1983 | Mitchell ................. F16D 67/02 192/93 A |
| 4,385,443 A | | 5/1983 | O'Banion |
| 4,427,203 A | | 1/1984 | Escue |
| 4,445,876 A | * | 5/1984 | Entrup ................. F16D 7/027 464/46 |
| 4,580,460 A | * | 4/1986 | Chang ................. F16H 55/20 74/395 |
| 4,884,344 A | * | 12/1989 | Martinez ............. B23D 49/165 30/273 |
| 5,006,740 A | * | 4/1991 | Palm ................. H02K 9/06 310/43 |
| 5,160,340 A | * | 11/1992 | Gary ................. B23D 47/12 83/881 |
| 5,335,746 A | * | 8/1994 | Betz ................. B60K 23/0808 180/248 |
| 5,699,888 A | * | 12/1997 | Showalter ............ F16D 27/115 74/650 |
| 5,897,119 A | | 4/1999 | McMillen |
| RE37,211 E | | 6/2001 | Bednar et al. |
| 6,264,211 B1 | | 7/2001 | Granado |
| 6,772,662 B2 | | 8/2004 | Marinkovich et al. |
| 6,851,193 B2 | | 2/2005 | Bednar et al. |
| 7,225,546 B2 | | 6/2007 | Hartmann |
| 7,658,012 B2 | | 2/2010 | James et al. |
| 7,793,420 B2 | | 9/2010 | Griep et al. |
| 7,996,996 B2 | | 8/2011 | Hirabayashi |
| 2001/0011420 A1 | | 8/2001 | Osada |
| 2004/0187322 A2 | | 9/2004 | Bednar et al. |
| 2004/0187324 A1 | | 9/2004 | James et al. |
| 2004/0231170 A1 | | 11/2004 | Neitzell et al. |
| 2005/0016001 A1 | * | 1/2005 | Griep ................. B25D 11/12 30/394 |
| 2005/0044729 A1 | | 3/2005 | Tachibana et al. |
| 2006/0117580 A1 | | 6/2006 | Serdynski et al. |
| 2007/0074408 A1 | | 4/2007 | Zhang |
| 2008/0189963 A1 | | 8/2008 | Griep et al. |
| 2008/0289196 A1 | | 11/2008 | Ohlendorf |

FOREIGN PATENT DOCUMENTS

| | | | | |
|---|---|---|---|---|
| EP | 0192015 A1 | | 8/1986 | |
| GB | 850601 A | * | 10/1960 | |
| GB | 994574 A | * | 6/1965 | |
| GB | 1172450 | | 11/1969 | |
| GB | 2297000 A | * | 7/1996 | ............ F16B 31/02 |
| GB | 2147667 A | | 4/2006 | |
| GB | 2418888 | | 4/2006 | |
| JP | 04013514 A | | 1/1992 | |
| JP | 2001009632 A | * | 1/2001 | ............ B23D 51/16 |
| JP | 2005014111 | | 1/2005 | |

OTHER PUBLICATIONS

Examination Report from the United Kingdom Intellectual Property Office for Application No. 10121413.9 dated Apr. 30, 2012 (2 pages).

German Patent Office Action for Application No. 102010038343.0 dated Jan. 19, 2022 (11 pages including statement of relevance).

* cited by examiner

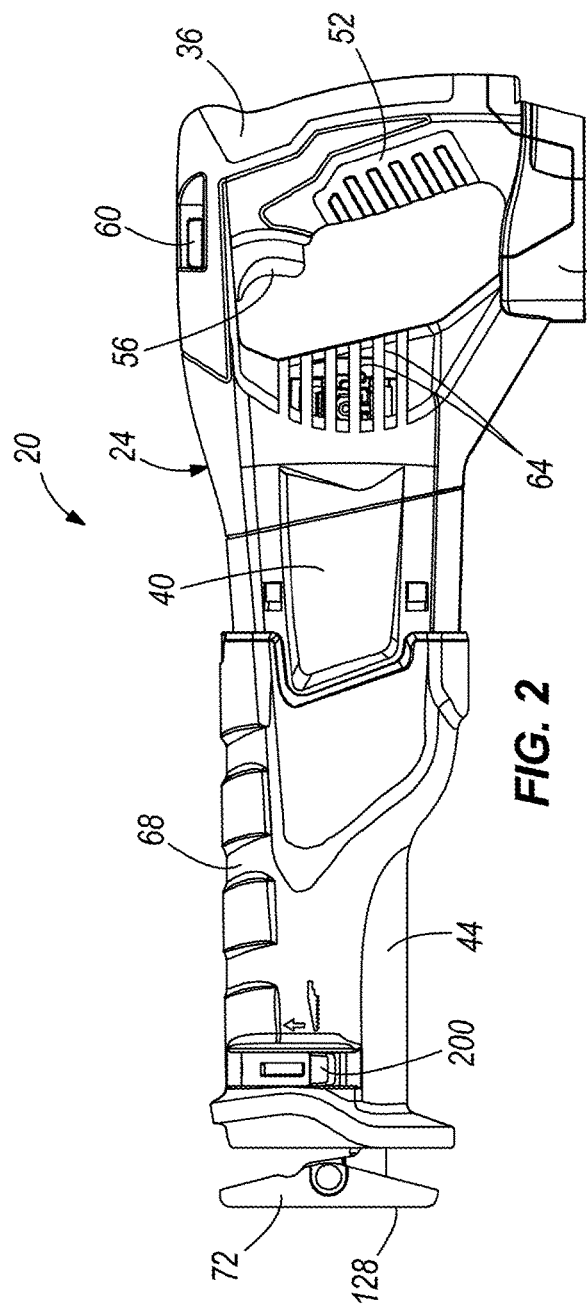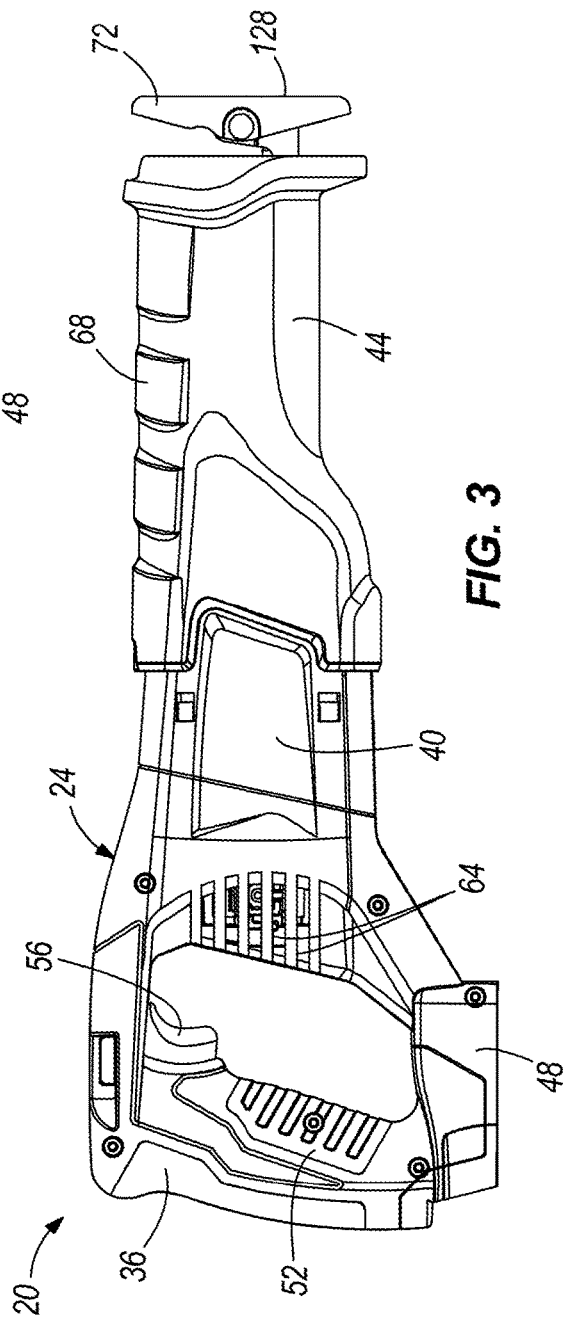

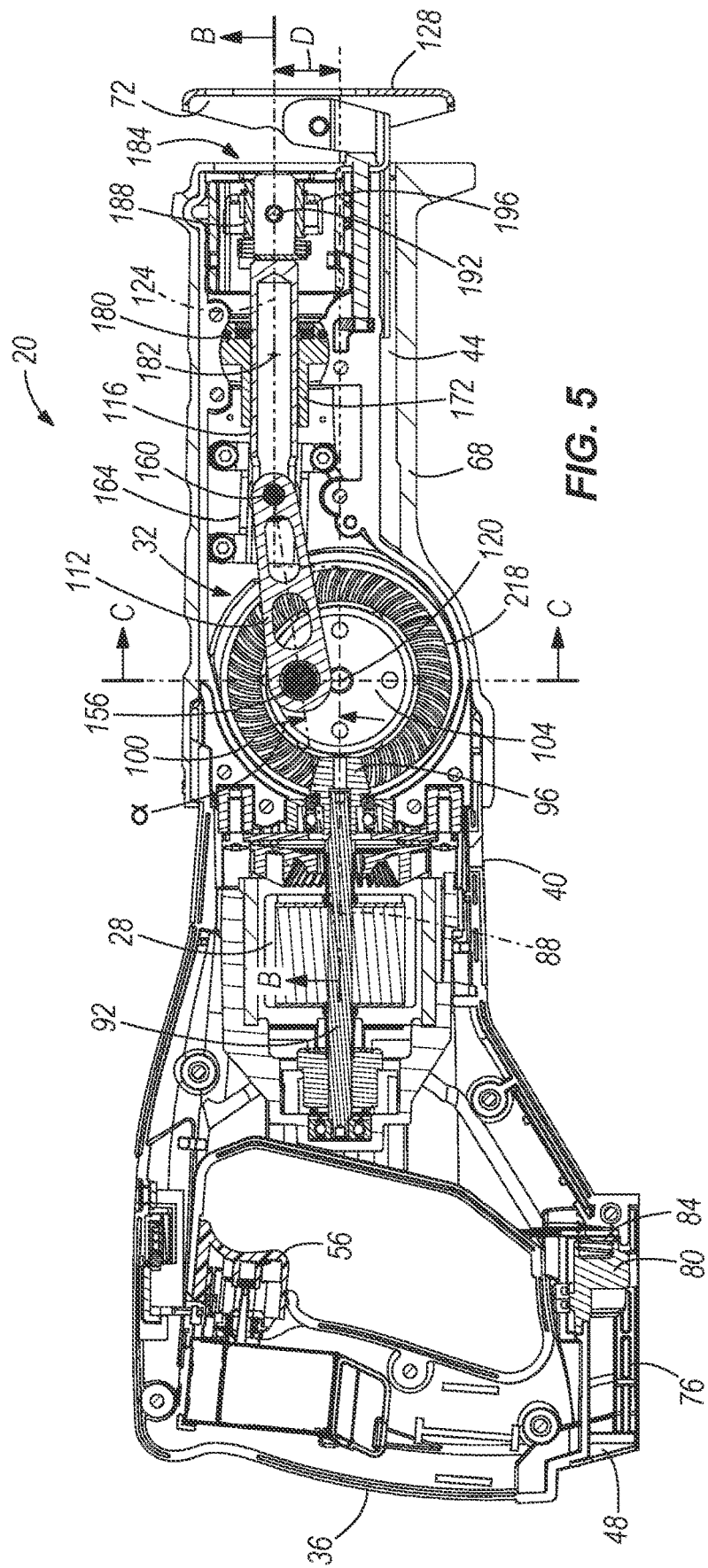

RECIPROCATING SAW

CROSS-REFERENCE TO RELATED APPLICATIONS

This application is a divisional of U.S. patent application Ser. No. 15/410,359, filed Jan. 19, 2017, now U.S. Pat. No. 10,464,148, which is a continuation of U.S. patent application Ser. No. 12/842,209, filed Jul. 23, 2010, now U.S. Pat. No. 9,579,735, which claims priority to U.S. Provisional Patent Application No. 61/228,017, filed Jul. 23, 2009, the entire contents of all of which are hereby incorporated by reference.

BACKGROUND

The present invention relates to power tools and, more particularly, to reciprocating saws.

SUMMARY

In one embodiment, the invention provides a reciprocating saw including a housing assembly and a motor positioned substantially within the housing assembly. The motor includes a pinion. The reciprocating saw also includes a drive mechanism positioned substantially within the housing assembly. The drive mechanism includes a gear coupled to and driven by the pinion, a spindle reciprocatable relative to the housing assembly, and a connecting rod extending between the gear and the spindle to transmit rotation of the gear into reciprocation of the spindle. The reciprocating saw further includes a bushing positioned substantially within the housing assembly about at least a portion of the spindle. The bushing is pivotable relative to the housing assembly to accommodate non-linear rocking motion of the spindle. The reciprocating saw also includes a seal surrounding a portion of the bushing. The seal includes a first lip extending radially from the bushing and a second lip spaced apart from the first lip and extending radially from the bushing. The second lip is movable relative to the first lip. Both the first lip and the second lip continuously engage the housing assembly when the bushing pivots relative to the housing assembly.

In another embodiment, the invention provides a reciprocating saw including a housing assembly and a motor positioned substantially within the housing assembly. The motor includes a pinion. The reciprocating saw also includes a drive mechanism positioned substantially within the housing assembly. The drive mechanism includes a gear coupled to and driven by the pinion. The gear is rotatably coupled to the housing assembly for rotation about an axis. The gear has an outer periphery. The drive mechanism also includes a hub coupled to the gear for rotation with the gear about the axis, a spindle reciprocatable relative to the housing assembly, a connecting rod having a first end coupled to the hub and a second end coupled to the spindle to transmit rotation of the hub into reciprocation of the spindle, and a counterweight rotatably coupled to the housing assembly for rotation about the axis within the outer periphery of the gear. The counterweight is also coupled to the first end of the connecting rod such that the counterweight is moved in a substantially opposite direction than the spindle to counterbalance reciprocation of the spindle.

In yet another embodiment, the invention provides a reciprocating saw including a housing assembly and a motor positioned substantially within the housing assembly. The motor includes a pinion. The reciprocating saw also includes a drive mechanism positioned substantially within the housing assembly. The drive mechanism includes a gear coupled to and driven by the pinion, a hub coupled to the gear for rotation with the gear, a spindle reciprocatable relative to the housing assembly, and a connecting rod extending between the hub and the spindle to transmit rotation of the hub into reciprocation of the spindle. The reciprocating saw further includes a clutch assembly coupled to the drive mechanism to selectively transmit drive force from the gear to the hub. The clutch assembly includes a first disk coupled to the gear, a second disk coupled to the hub, a biasing member positioned between the hub and the gear to bias the first and second disks into frictional engagement, and a threaded fastener extending through the gear and threadably engaging the hub to couple the hub to the gear. Tightening the threaded fastener pulls the hub toward the gear to preload the biasing member.

In still another embodiment, the invention provides a reciprocating saw including a housing assembly and a motor positioned substantially within the housing assembly. The motor includes a pinion. The reciprocating saw also includes a drive mechanism positioned substantially within the housing assembly. The drive mechanism includes a gear coupled to and driven by the pinion. The gear is rotatably coupled to the housing assembly for rotation about an axis. The gear has an outer periphery. The drive mechanism also includes a hub coupled to the gear for rotation with the gear about the axis, a spindle reciprocatable relative to the housing assembly, a connecting rod having a first end coupled to the hub and a second end coupled to the spindle to transmit rotation of the hub into reciprocation of the spindle, and a counterweight rotatably coupled to the housing assembly for rotation about the axis within the outer periphery of the gear. The counterweight is also coupled to the first end of the connecting rod such that the counterweight is moved in a substantially opposite direction than the spindle to counterbalance reciprocation of the spindle. The reciprocating saw further includes a bushing positioned substantially within the housing assembly about at least a portion of the spindle. The bushing is pivotable relative to the housing assembly to accommodate non-linear rocking motion of the spindle. The reciprocating saw also includes a seal surrounding a portion of the bushing. The seal includes a first lip extending radially from the bushing and a second lip spaced apart from the first lip and extending radially from the bushing. The second lip is movable relative to the first lip. Both the first lip and the second lip continuously engage the housing assembly when the bushing pivots relative to the housing assembly. The reciprocating saw further includes a clutch assembly coupled to the drive mechanism to selectively transmit drive force from the gear to the hub. The clutch assembly includes a first disk coupled to the gear, a second disk coupled to the hub, a biasing member positioned between the hub and the gear to bias the first and second disks into frictional engagement, and a threaded fastener extending through the gear and threadably engaging the hub to couple the hub to the gear. Tightening the threaded fastener pulls the hub toward the gear to preload the biasing member.

Other aspects of the invention will become apparent by consideration of the detailed description and accompanying drawings.

BRIEF DESCRIPTION OF THE DRAWINGS

FIG. 2 is a left side view of the reciprocating saw shown in FIG. 1.

FIG. 3 is a right side view of the reciprocating saw shown in FIG. 1.

FIG. 5 is a cross-sectional view of the reciprocating saw shown in FIG. 1.

FIG. 5A illustrates a half-crescent-shaped cutting path.

FIG. 5B illustrates a full-crescent-shaped cutting path.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

DETAILED DESCRIPTION

Figure 1:
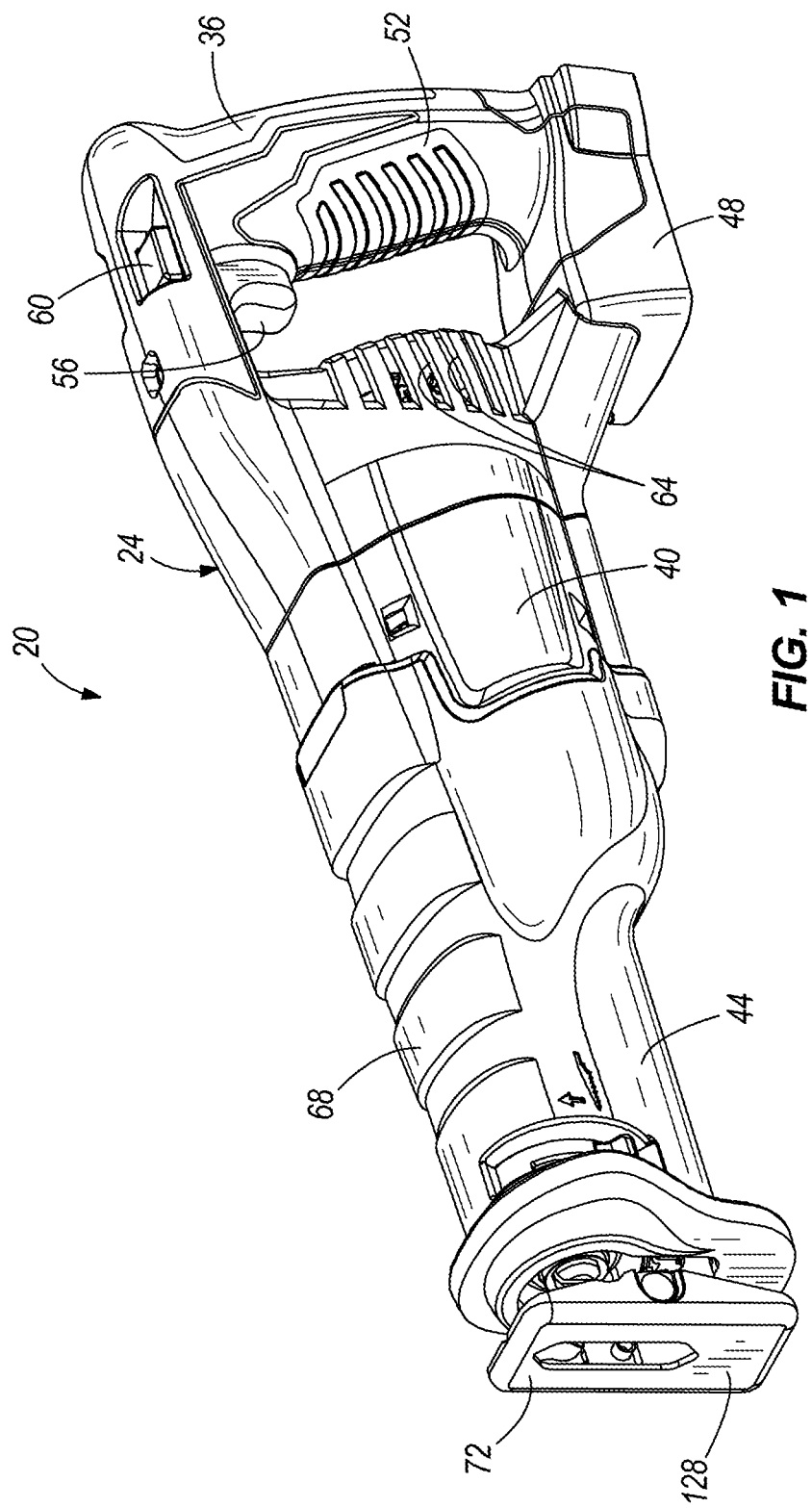
FIG. 1 is a perspective view of a reciprocating saw according to one embodiment of the invention.

FIGS. 1-3 illustrate a power tool 20 according to one embodiment of the invention. The illustrated power tool 20 is a reciprocating saw that is operable to drive a saw blade (not shown) in an orbital or rocking cutting motion. In the illustrated embodiment, the reciprocating saw 20 is set to reciprocate the saw blade through a stroke length of either ¾" or 1⅛". Setting the stroke length at ¾" reciprocates the saw blade at a relatively smaller stroke length, but provides greater control for an operator and produces fewer vibrations. Setting the stroke length at 1⅛" reciprocates the saw blade at a relatively longer stroke length such that the blade cuts faster. In other embodiments, the reciprocating saw 20 may be set to reciprocate the saw blade by a different stroke length or the stroke length may be variably set by the operator during use.

The reciprocating saw 20 includes a housing assembly 24, a motor 28 (FIG. 4) positioned substantially within the housing assembly 24, and a drive mechanism 32 (FIG. 4) driven by the motor 28 and positioned substantially within the housing assembly 24. As shown in FIGS. 1-3, the housing assembly 24 includes a grip portion 36, a body portion 40, a neck portion 44, and a battery connecting portion 48. The grip portion 36 is shaped and sized to be grasped by an operator while using the reciprocating saw 20. In the illustrated embodiment, an elastomeric overmold 52 at least partially covers the grip portion 36 to facilitate handling of the reciprocating saw 20. An actuator or trigger 56 extends from and is supported by the grip portion 36. The trigger 56 is electrically coupled between a power source (e.g., a battery pack, a wall outlet, etc.) and the motor 28 to selectively provide power to the motor 28. Actuating (e.g., depressing) the trigger 56 electrically connects the motor 28 to the power source to drive the motor 28. A hi/lo shuttle 60 also extends from and is supported by the grip portion 36 generally above the trigger 56. The shuttle 60 selectively adjusts the operating speed of the motor 28 between a relatively high operating speed and a relatively low operating speed.

The body portion 40 and the neck portion 44 extend from the grip portion 36 and substantially enclose the motor 28 and the drive mechanism 32. The illustrated body portion 40 defines a plurality of vents 64 adjacent to the grip portion 36. The vents 64 facilitate cooling of the motor 28 during use. Similar to the grip portion 36, the neck portion 44 is shaped and sized to be grasped by an operator while using the reciprocating saw 20. In the illustrated embodiment, the neck portion 44 is at least partially covered by an injection molded casing 68 to insulate the operator from heat generated by the motor 28 and the drive mechanism 32. A shoe 72 is pivotally coupled to an end of the neck portion 44 substantially opposite the grip portion 36.

Figure 4:
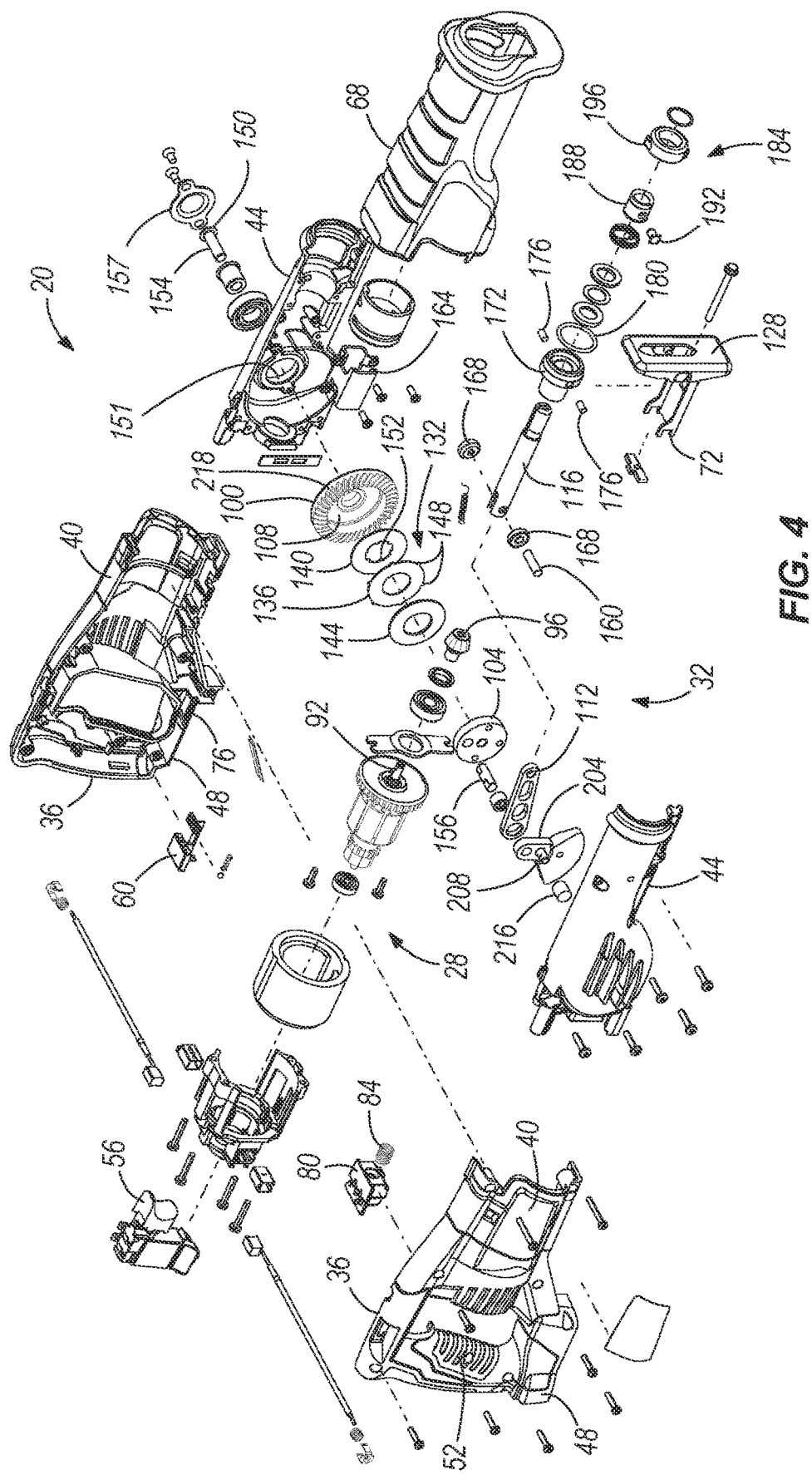
FIG. 4 is an exploded perspective view of the reciprocating saw shown in FIG. 1.

The battery connecting portion 48 is coupled to the grip portion 36 and is configured to support a battery pack (not shown), such as an 18 volt rechargeable Li-ion power tool battery pack. In other embodiments, the battery pack may have other battery chemistries, such as Ni—Cd or Ni—MH, or the battery pack may have a different voltage. The illustrated connecting portion 48 includes a pair of guide rails 76 (only one of which is shown in FIGS. 4 and 5) and a terminal block assembly 80. The guide rails 76 engage corresponding rails on the battery pack to secure the battery pack to the housing assembly 24. The terminal block assembly 80 engages battery terminals on the battery pack to electrically connect the battery pack to the motor 28. A biasing member 84 (e.g., a coil spring shown in FIGS. 4 and 5) biases the terminal block assembly 80 out of the connecting portion 48 and into engagement with the battery pack terminals. The biasing member 84 allows the terminal block assembly 80 to move slightly relative to the guide rails 76 when the battery pack is being connected, increasing the tolerance between the connecting portion 48 and the battery pack. In some embodiments, the connecting portion 48 may define an opening that receives an insertable tower-style battery pack. In other embodiments, such as the embodiment shown in FIGS. 12-15, the reciprocating saw 20 may be a corded power tool.

As shown in FIGS. 4 and 5, the motor 28 is positioned substantially within the body portion 40 of the housing assembly 24 and is electrically connected to the terminal block assembly 80 through the trigger 56. The motor 28 defines an axis 88 and includes a shaft 92 and a pinion 96 that rotate about the axis 88. The pinion 96 engages a gear 100 of the drive mechanism 32 to transmit rotation from the motor 28 to the gear 100.

The drive mechanism 32 is positioned within the body portion 40 and the neck portion 44 of the housing assembly 24. The illustrated drive mechanism 32 is a slider-crank mechanism and includes the gear 100, a hub 104 positioned within an opening 108 (FIG. 4) in the gear 100, a connecting rod 112 coupled to the hub 104, and a spindle 116 coupled to the connecting rod 112. As shown in FIG. 5, the gear 100 is vertically-oriented within the housing assembly 24. That is, the gear 100 is oriented to rotate about an axis 120 that is generally perpendicular to a longitudinal axis 124 defined by the spindle 116, as well as the axis 88 of the motor 28, and is generally perpendicular to an outer face 128 of the shoe 72. Vertically-orienting the gear 100, as opposed to a horizontally-oriented gear, narrows a width of the housing assembly 24 to facilitate grasping the neck portion 44 by an operator with smaller hands. For example, in some embodiments, the neck portion may have a width less than approximately 2.5". In the illustrated embodiment, the neck portion 44 has a width of approximately 2.0".

Figure 7:
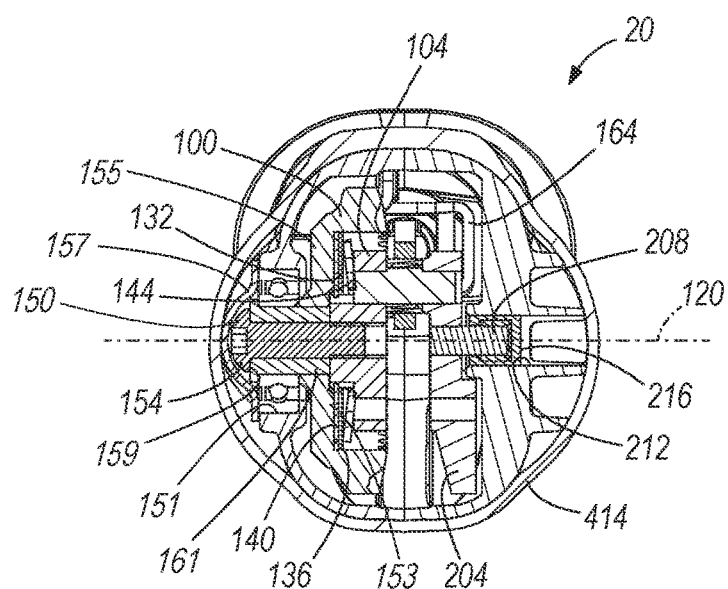
FIG. 7 is a cross-sectional view of the reciprocating saw taken along section line C-C of FIG. 5.

The hub 104 is coupled to the gear 100 for rotation with the gear 100. As shown in FIGS. 4 and 7, a clutch assembly 132 is positioned substantially between the gear 100 and the hub 104 within the opening 108 to selectively transmit drive force from the gear 100 to the hub 104 and to selectively allow relative movement between the gear 100 and the hub 104. The illustrated clutch assembly 132 is a slip-clutch, although other suitable clutches may be employed. During normal operation of the reciprocating saw 20, the gear 100 transmits drive force to the hub 104 through the clutch assembly 132 to reciprocate the saw blade. If the saw blade binds on a work piece, or is otherwise subjected to a relatively large stopping force, the clutch assembly 132 allows relative movement between the gear 100 and the hub 104 to absorb the impact, thereby reducing wear on the drive mechanism 32.

In the illustrated embodiment, the clutch assembly 132 includes two clutch disks 136, 140 and a disk spring 144. In other embodiments, the clutch assembly 132 may include fewer or more clutch disks 136, 140 or a face of the hub 104 may directly engage a face of the gear 100. The first clutch disk 136 includes a plurality of radially-outwardly projecting splines 148 that engage corresponding grooves formed on the inner surface of the gear 100. The second clutch disk 140 includes a plurality of radially-inwardly projecting splines 152 that engage corresponding grooves on the hub 104. The disk spring 144, or biasing member, (e.g., a Belleville washer) biases the second clutch disk 140 into frictional engagement with the first clutch disk 136 such that rotation of the gear 100 is transmitted through the clutch disks 136, 140 to the hub 104. If the load on the spindle 116 or on the motor 28 exceeds the force applied by the disk spring 144, the clutch disks 136, 140 will slip relative to each other, absorbing potential impacts on the drive mechanism 32.

Figure 6:
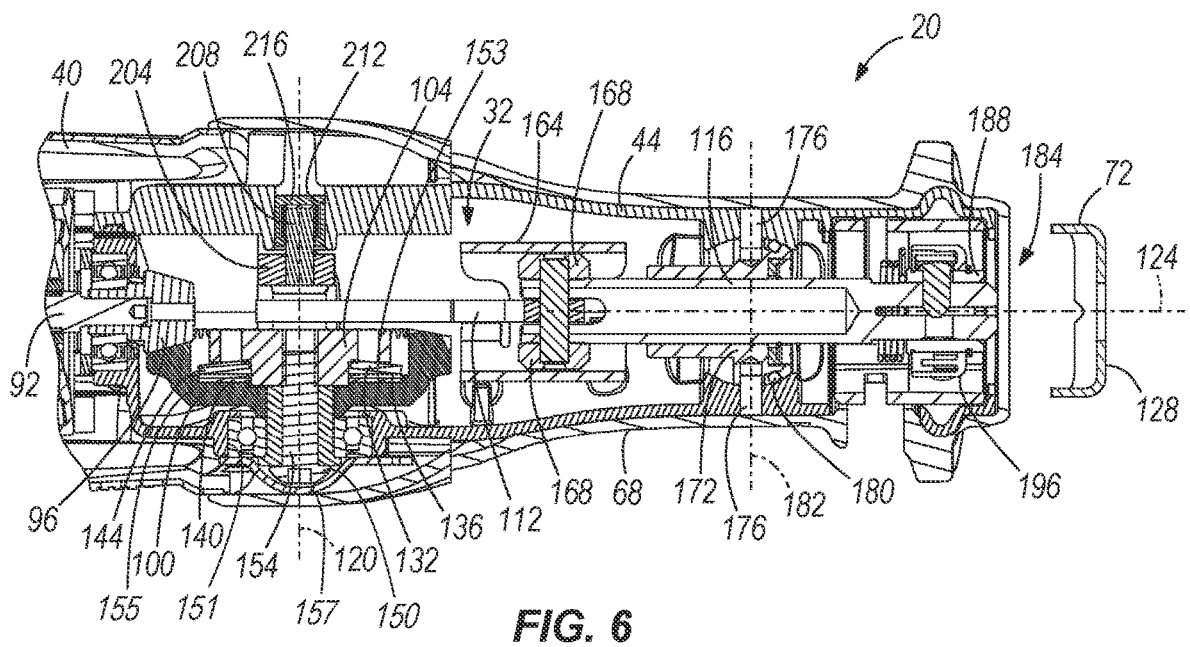
FIG. 6 is a cross-sectional view of the reciprocating saw taken along section line B-B of FIG. 5.

As shown in FIGS. 6 and 7, a threaded fastener 154 extends through the gear 100 and threadably engages the hub 104. Tightening (e.g., rotating) the fastener 154 pulls the hub 104 toward the gear 100 and into the opening 108 until the hub 104 abuts the gear 100. As the hub 104 moves toward the gear 100, the hub 104 pushes against the disk spring 144 to preload the disk spring 144. In the illustrated embodiment, the disk spring 144 is preloaded to about 175 in·lbs. An inner face of the gear 100 functions as a mechanical stop to prevent further movement of the hub 104 toward the gear 100 such that the disk spring 144 is only preloaded up to a predetermined amount. Once the hub 104 abuts the gear 100, the fastener 154 is further tightened or torqued (e.g., between about 180 and 225 in·lbs) to secure the gear 100 and the hub 104 together. Using the threaded fastener 154, as opposed to a press-fit pin, reduces assembly time of the clutch assembly 132 and increases the overall robustness of the assembly 132. As shown in in FIGS. 4, 6, and 7, the fastener 154 includes a head 150 that is positioned at least proximate an aperture 151 defined by the neck portion 44 of the housing assembly 24. The gear 100 includes a first side 153 facing toward the hub 104 and a second side 155 facing away from the hub 104. The head 150 is positioned closer to the second side 155 of the gear 100 than the first side 153. The head 150 defines a shoulder 159 that faces toward the second side 155 of the gear 100. A cover 157 is coupled to the neck portion 44 to cover the aperture 151. The clutch assembly 132 also includes a bushing 161 positioned about a portion of the threaded fastener 154 and between the shoulder 159 and the hub 104. The bushing 161 extends through the gear 100 and through the aperture 151.

Referring back to FIGS. 4 and 5, one end of the connecting rod 112, or drive arm, is connected to the hub 104 by a crank pin 156 and the opposite end of the connecting rod 112 is connected to the spindle 116 by a pivot pin 160. The crank pin 156 is offset from the gear axis 120 such that, as the gear 100 rotates, the crank pin 156 moves about the gear axis 120. Movement of the crank pin 156 is transmitted by the connecting rod 112 into generally linear motion at the pivot pin 160 to reciprocate the spindle 116 generally along the spindle axis 124. Rotary motion from the motor 28 is thereby translated into reciprocating motion of the spindle 116 by the gear 100 and the connecting rod 112.

The spindle 116 reciprocates within the neck portion 44 generally along the spindle axis 124. As mentioned above, the reciprocating saw 20 reciprocates the saw blade in an orbital or rocking motion. The spindle 116 therefore does not reciprocate in a perfectly straight line. As shown in FIGS. 4-6, a guide block 164 is coupled to an inner surface of the neck portion 44 to guide and support the spindle 116 during reciprocation. Rollers 168 are coupled to the spindle 116 and the connecting rod 112 by the pivot pin 160 to facilitate movement of the spindle 116 within the guide block 164. The illustrated guide block 164, or orbit slot, is tilted or angled relative to the motor axis 88 such that the spindle axis 124 is not parallel (i.e., non-parallel) to the motor axis 88. In the illustrated embodiment, the guide block 164 is tilted about 1.5° relative to the motor axis 88. In other embodiments, the guide block 164 may be tilted by a greater or lesser degree relative to the motor axis 88.

Reciprocating the spindle 116 within the inclined guide block 164 creates the orbital or rocking motion of the saw blade during cutting operations. During most of a cutting stroke, the spindle 116 is tipped downward into a work piece to increase the cutting force of the saw blade on the work piece. In embodiments where the stroke length of the saw blade is set at ¾", the angle of the spindle 116 relative to the motor axis 88 ranges from about −0.07° to about 0.45°. In embodiments where the stroke length of the saw blade is set at 1⅛", the angle of the spindle 116 relative to the motor axis 88 ranges from about −0.30° to about 0.55°.

A bushing 172 also surrounds a portion of the spindle 116 to help guide the spindle 116 during reciprocation. The bushing 172 is positioned forward of the guide block 164 and is coupled to the housing assembly 24 by pins 176 (FIG. 4) such that the bushing 172 may pivot relative to the housing assembly 24. As the spindle 116 reciprocates, the bushing 172 tilts to accommodate the non-linear orbital or rocking motion of the spindle 116. An elastomeric seal 180 (e.g., an O-ring) surrounds a portion of the bushing 172 to reduce wear between the bushing 172 and the housing assembly 24 and to seal the internal components of the drive mechanism 32.

As shown in FIG. 5, a pivot axis 182 (FIGS. 5 and 6) of the bushing 72 is offset a vertical distance D from the motor axis 88. The illustrated pivot axis 182 is defined by the pins 176 (FIG. 4) and is located generally between the connecting rod 112 and the seal 180 along the longitudinal axis 124 of the spindle 116. Offsetting the pivot axis 182 creates the orbital cutting motion of the saw blade and increases the cutting stroke speed in at least one direction. The illustrated reciprocating saw 20 reciprocates the saw blade through a half-crescent-shaped cutting path $C_1$ (FIG. 5A) relative to a work piece W, as opposed to a full-crescent-shaped cutting path $C_2$ (FIG. 5B) if the pivot axis 182 was not offset from the motor axis 88. By offsetting the pivot axis 182 generally above the motor axis 88 (as the saw 20 is oriented in FIG. 5), the saw blade is reciprocated with a relatively quicker return stroke than out stroke. Conversely, if the pivot axis 182 were offset generally below the motor axis 88, the saw blade would be reciprocated with a relatively quicker out stroke than return stroke.

The vertical distance D between the motor axis 88 and the pivot axis 182 is decreased compared to conventional reciprocating saws. In some embodiments, the distance D may be between about 0.5" and about 1.0". In the illustrated embodiment, the distance D is about 0.78". Decreasing the vertical distance D decreases the size of the neck, or nose, portion 44 of the housing assembly 24, allowing for a slimmer design of the reciprocating saw 20. For example, in some embodiments, the neck portion 44 may have a height less than approximately 3.0". In the illustrated embodiment, the neck portion 44 has a height of approximately 2.75".

The connecting rod 112 is angled or tilted relative to the motor axis 88 by an angle α. In the illustrated reciprocating saw 20, the guide block 164 is positioned relative to the gear 100 to reduce the maximum value of the angle α (i.e., when the crank pin 156 is rotated to its lowest point on the gear 100). For example, in embodiments where the stroke length of the saw blade is set at ¾", the angle α of the connecting rod 112 relative to the motor axis 88 ranges from about 10° to about 30° as the gear 100 rotates. In embodiments where the stroke length of the saw blade is set at 1⅛", the angle α of the connecting rod 112 relative to the motor axis 88 ranges from about 5° to about 35° as the gear 100 rotates. Moving the guide block 164 relatively closer to or further from the motor axis 88 decreases or increases the maximum value of the angle α, respectively. Reducing the angle α of the connecting rod 112 reduces vibrations of the reciprocating saw 20 by having a higher portion of forces from the connecting rod 112 act through the spindle 116 instead of on the guide block 164. Forces acting on the guide block 164 are transmitted to the user through the housing assembly 24 as vibrations.

As shown in FIGS. 4-6, a blade clamp 184 is mounted to an end of the spindle 116 substantially opposite the pivot pin 160. The blade clamp 184 secures the saw blade, or other tool element, to the spindle 116 for reciprocation with the spindle 116. The illustrated blade clamp 184 includes a sleeve 188 that receives a portion of the saw blade, a lock pin 192 that is movable into engagement with the portion of the saw blade, and a cam 196 that is actuatable to move the lock pin 192 relative to the sleeve 188. Rotating the cam 196 relative to the sleeve 188 slides the lock pin 192 toward and away from the saw blade to lock and unlock the saw blade. A blade release lever 200 (FIG. 2) extends outwardly from the neck portion 44 adjacent to the shoe 72. Actuating (e.g., sliding) the lever 200 rotates the cam 196 such that the saw blade may be locked and unlocked without the use of tools.

As shown in FIG. 4, the illustrated drive mechanism 32 includes a counterweight 204 to help balance forces generated by the spindle 116 and the saw blade during reciprocation. The counterweight 204 is coupled to the connecting rod 112 via the crank pin 156 and includes a guide pin 208 extending axially away from the gear 100. In the illustrated embodiment, the crank pin 156 is press-fit into the counterweight 204. In other embodiments, the counterweight 204 may be secured to the crank pin 156 using other suitable coupling means. As shown in FIG. 7, the guide pin 208 is generally coaxial with the gear axis 120 and engages a corresponding recess 212 in the housing assembly 24. Similar to the crank pin 156, the guide pin 208 may also be press-fit into the counterweight 204. A bearing 216 is positioned within the recess 212 about the guide pin 208 to facilitate rotation of the pin 208 relative to the housing assembly 24. As the gear 100 rotates and drives the crank pin 156, the counterweight 204 is moved in a substantially opposite direction than the spindle 116 to counterbalance the spindle forces. In the illustrated embodiment, the counterweight 204 rotates within an outer periphery 218, or perimeter, of the gear 100 such that no portion of the counterweight 204 extends beyond the outer periphery 218.

Figure 8:
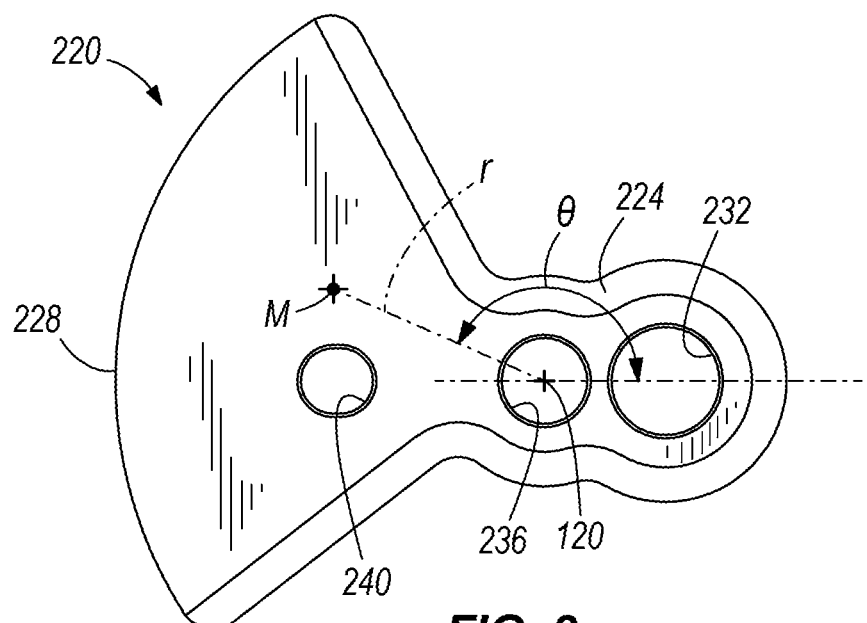
FIG. 8 illustrates an embodiment of a counterweight for use with a reciprocating saw.
Figure 9:
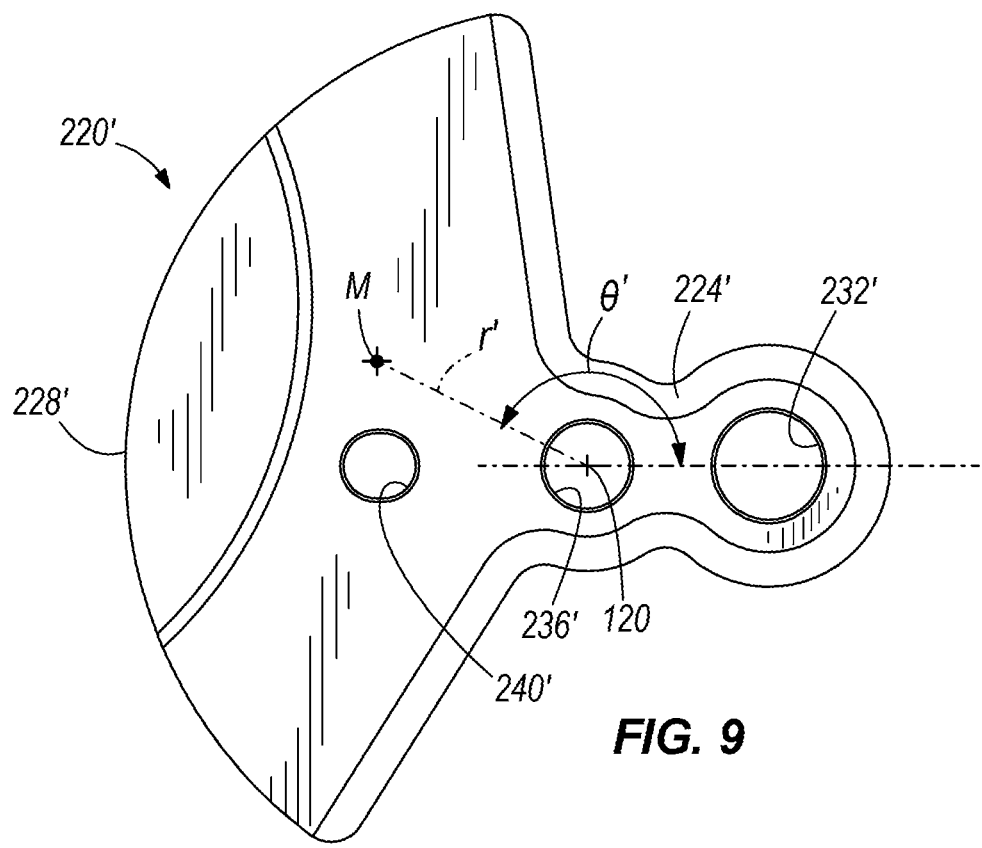
FIG. 9 illustrates another embodiment of a counterweight for use with a reciprocating saw.

FIGS. 8 and 9 illustrate two embodiments of counterweights 220, 220' for use with the reciprocating saw 20. Referring to FIG. 8, the illustrated counterweight 220 is configured for use with the reciprocating saw 20 when the stroke length of the saw blade is set at ¾". The counterweight 220 includes a connecting portion 224 and a mass portion 228. The connecting portion 224 defines a first aperture 232 that receives the crank pin 156 and a second aperture 236 that receives the guide pin 208. The mass portion 228 is semicircular-shaped to match the circular shape of the gear 100. The mass portion 228 defines an aperture 240 to optimize the location of a center of mass M of the counterweight 220 relative to the gear axis 120. For example, in the illustrated embodiment, the counterweight 220 weighs about 0.168 lbs and the center of mass M is located a distance r of about 0.502" from the gear axis 120 at an angle θ of about 166.2° from a line extending through the centers of the first and second apertures 232, 236 in the connecting portion 224.

Referring to FIG. 9, the illustrated counterweight 220' is configured for use with the reciprocating saw 20 when the stroke length of the saw blade is set at 1⅛". Similar to the counterweight 220 shown in FIG. 8, the counterweight 220' includes a connecting portion 224' and a mass portion 228'. The connecting portion 224' defines a first aperture 232' that receives the crank pin 156 and a second aperture 236' that receives the guide pin 208. The mass portion 228' is semicircular-shaped to match the circular shape of the gear 100. The mass portion 228' defines an aperture 240' to optimize the location of a center of mass M' of the counterweight 220' relative to the gear axis 120. In the illustrated embodiment, the counterweight 220' weighs about 0.260 lbs and the center of mass M' is located a distance r' of about 0.502" from the gear axis 120 at an angle θ' of about 168.4° from a line extending through the centers of the first and second apertures 232', 236' in the connecting portion 224'.

The total weight and the location of the center of mass of each counterweight 220, 220' are selected to minimize additional vibrations that may occur due to the inclusion of a counterweight in the reciprocating saw 20. There is a generally linear relationship between the counterweight variables and the reciprocating saw variables. In particular, the product of the total weight times the center of mass distance from the gear axis 120 (i.e., the counterweight variables) is generally linearly proportional to the product of the saw stroke length times the mass of non-counterweight moving parts of the saw (e.g., the connecting rod 112, the spindle 116, the blade clamp 188, etc.) times the no-load reciprocating speed of the saw squared (i.e., the reciprocating saw variables).

Figure 10:
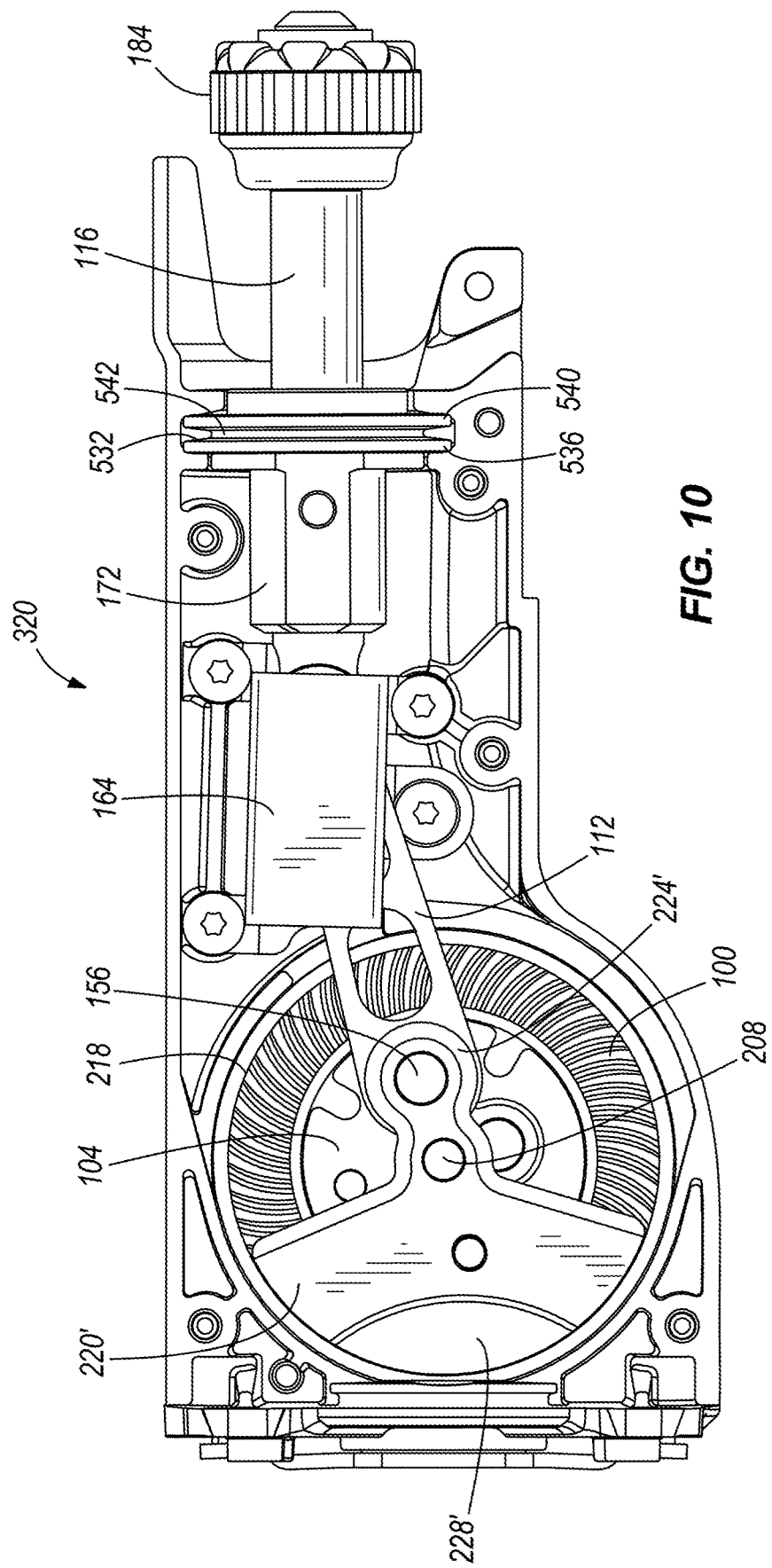
FIG. 10 is a cross-sectional view of a portion of a reciprocating saw including a spindle in an extended position and a counterweight in a first position.
Figure 11:
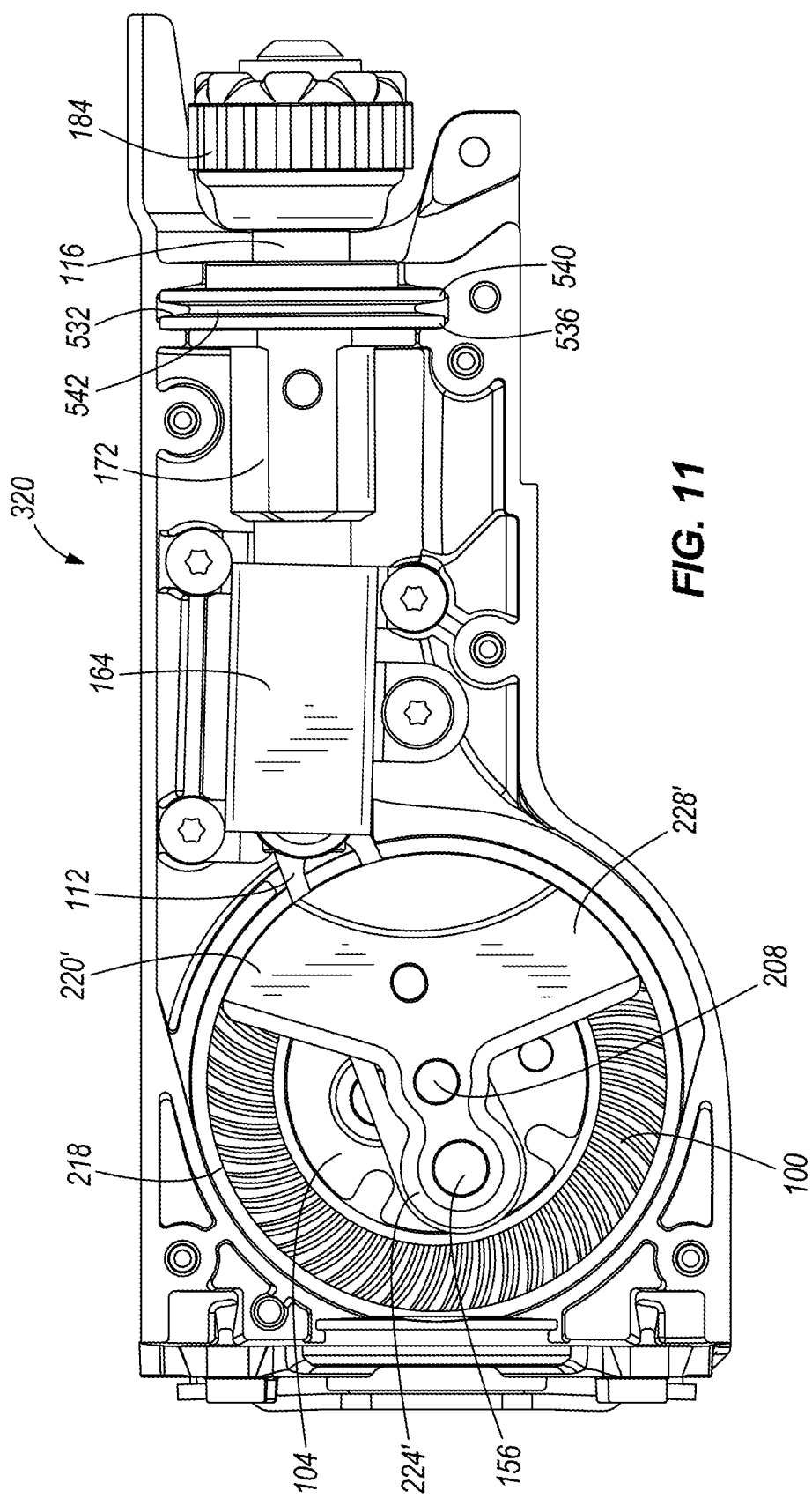
FIG. 11 is a cross-sectional view of the portion of the reciprocating saw shown in FIG. 10 including the spindle in a retracted position and the counterweight in a second position.

FIGS. 10 and 11 illustrate a reciprocating saw 320 that includes the counterweight 220' in more detail. The illustrated reciprocating saw 320 is similar to the reciprocating saw 20 discussed above with respect to FIGS. 1-7, and like parts have been given the same reference numbers.

As shown in FIG. 10, when the crank pin 156 is rotated about the gear axis 120 away from the motor 28 (to the right side of the gear 100 in FIG. 10), the connecting rod 112 pushes the spindle 116 out of the neck portion 44 to an extended position. In this position, the mass portion 228' of the counterweight 220' is rotated toward the motor 28 (to the left side of the gear 100 in FIG. 10) to counterbalance the movement of the spindle 116 and the saw blade.

As shown in FIG. 11, when the crank pin 156 is rotated about the gear axis 120 toward the motor 28 (to the left side of the gear 100 in FIG. 11), the connecting rod 112 pulls the spindle 116 into the neck portion 44 to a retracted position. In this position, the mass portion 228' of the counterweight 220' is rotated away from the motor 28 (to the right side of the gear 100 in FIG. 11) to counterbalance the movement of the spindle 116 and the saw blade.

FIGS. 12-15 illustrate another embodiment of a reciprocating saw 420. The illustrated reciprocating saw 420 is similar to the reciprocating saw 20 discussed above with respect to FIGS. 1-7. Reference is hereby made to the description of the reciprocating saw 20 above for discussion of features and elements of the reciprocating saw 420, as well as alternatives to the features and elements, not specifically discussed herein.

The reciprocating saw 420 includes a housing assembly 424, a motor 428 positioned substantially within the housing assembly 424, and a drive mechanism 432 driven by the motor 428 and positioned substantially within the housing assembly 424. The housing assembly 424 includes a grip portion 436, a body portion 440, and a neck portion 444. An actuator or trigger 448 extends from the grip portion 436 to selectively provide power to the motor 428. In the illustrated embodiment, the body portion 440 is formed as a separate piece from both the grip portion 436 and the neck portion 444. In other embodiments, the body portion 440 may be integrally formed as a single piece with the grip or neck portions 436, 444. An injection molded casing 452 at least partially covers the neck portion 444 to insulate an operator from heat generated by the motor 428 and the drive mechanism 432.

Figure 12:
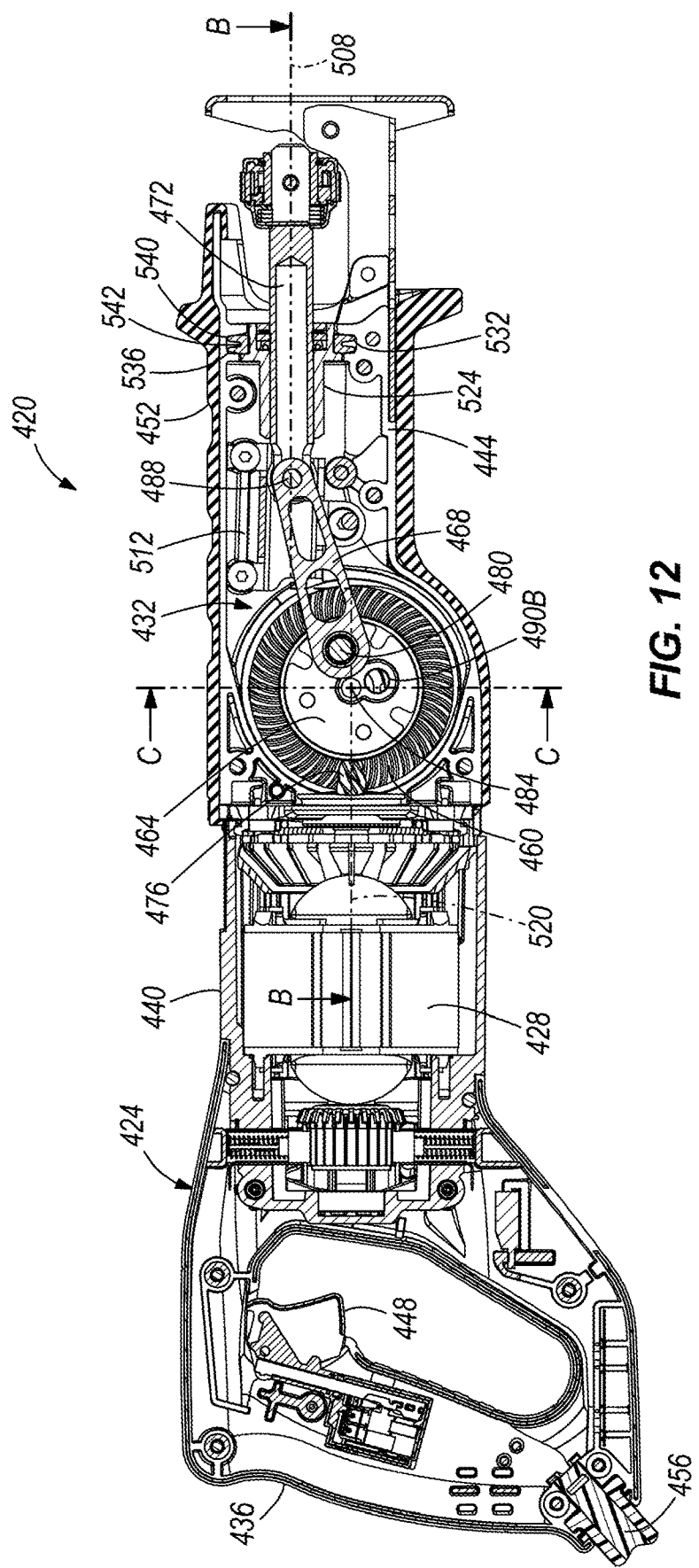
FIG. 12 is a cross-sectional view of a reciprocating saw according to another embodiment of the invention.
Figure 13:
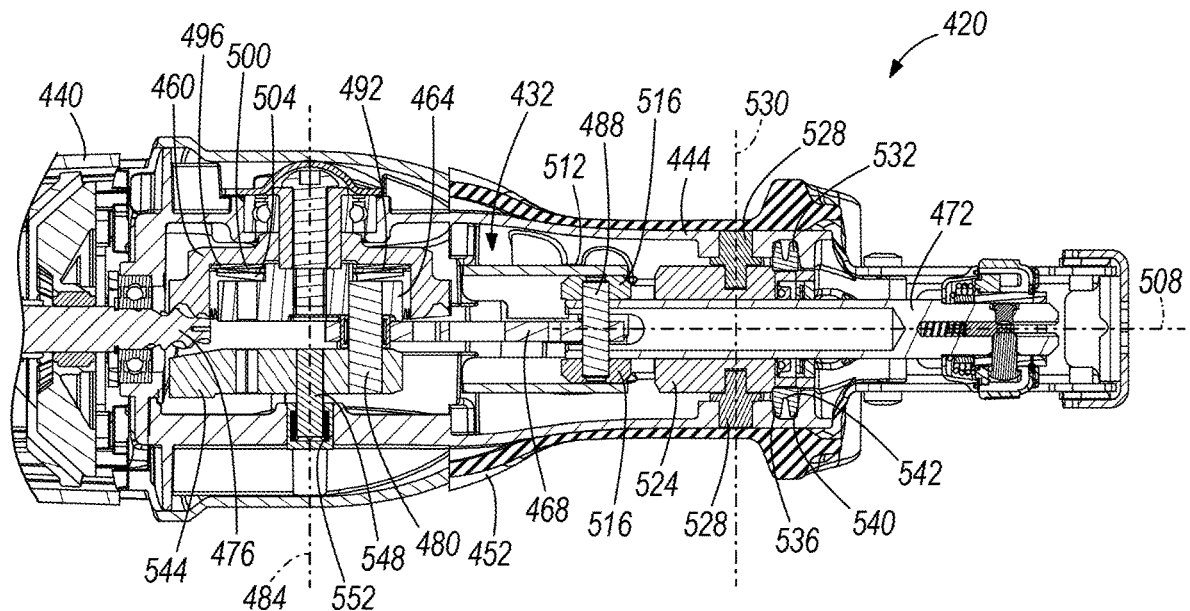
FIG. 13 is a cross-sectional view of the reciprocating saw taken along section line B-B of FIG. 12.
Figure 15:
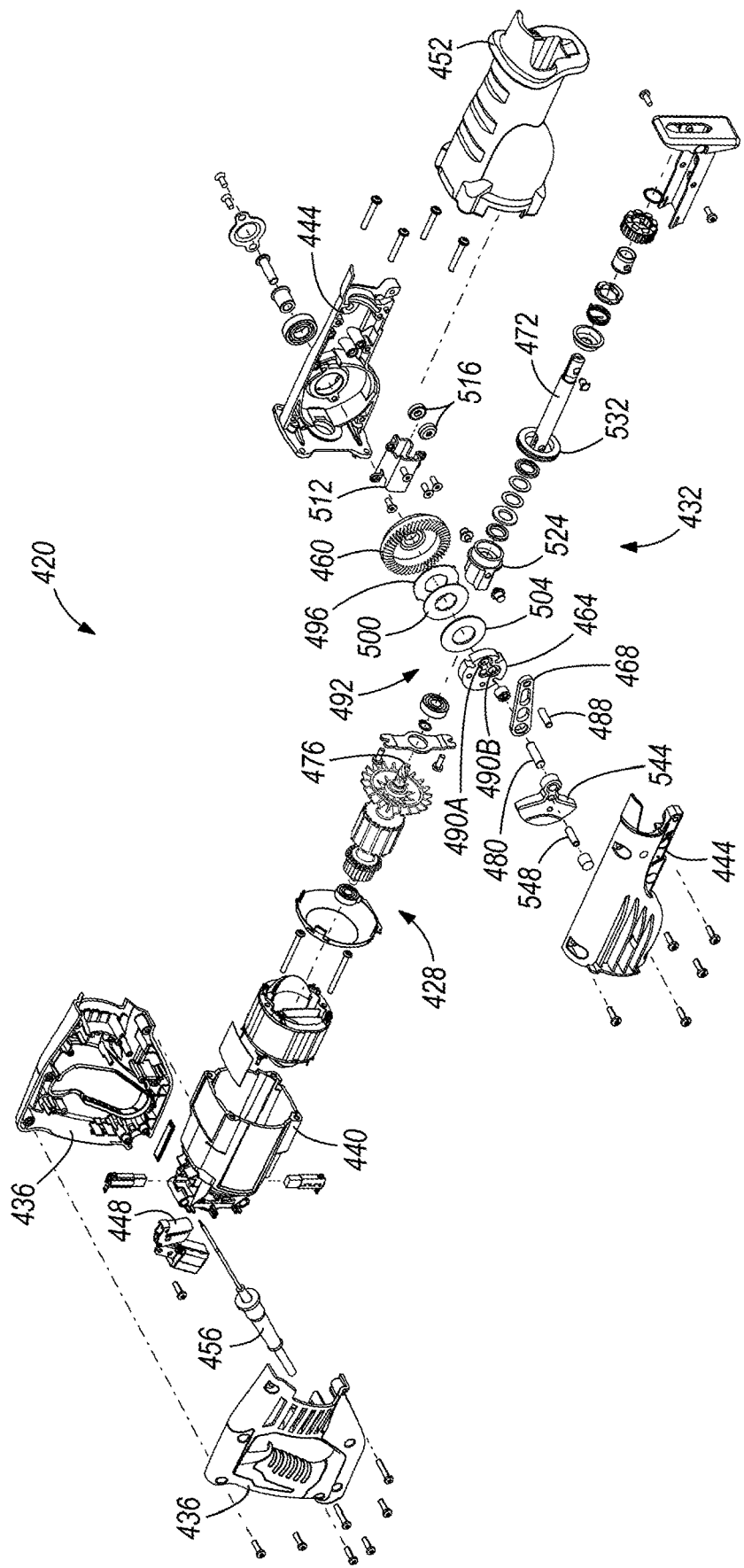
FIG. 15 is an exploded perspective view of the reciprocating saw shown in FIG. 12.

As shown in FIGS. 12 and 15, the reciprocating saw 420 includes a power cord 456. The cord 456 extends outwardly from the grip portion 436 and is electrically coupled to the motor 428 through the trigger 448. The cord 456 plugs into a wall outlet, generator, or other AC power source to provide power to the motor 428 when the trigger 448 is actuated. In other embodiments, the reciprocating saw 420 may be powered by a battery pack or other DC power source.

Similar to the drive mechanism 32 discussed above, the illustrated drive mechanism 432 is a slider-crank mechanism and includes a gear 460, a hub 464, a connecting rod 468, and a spindle 472. The gear 460 is rotated by a pinion 476 of the motor 428 to rotate the hub 464. One end of the connecting rod 468 is coupled to the hub 464 by a crank pin 480 that is offset from a rotation axis 484 of the gear 460. The opposite end of the connecting rod 468 is coupled to the spindle 472 by a pivot pin 488 to transmit rotary motion of the gear 460 into reciprocating motion of the spindle 472. In the illustrated embodiment, the crank pin 480 is inserted through a first opening 490A of the hub 464 to set a stroke length of a saw blade at 1⅛". In other embodiments, the crank pin 480 may be inserted through a second opening 490B of the hub 464 to set a stroke length of the saw blade at ¾".

Figure 14:
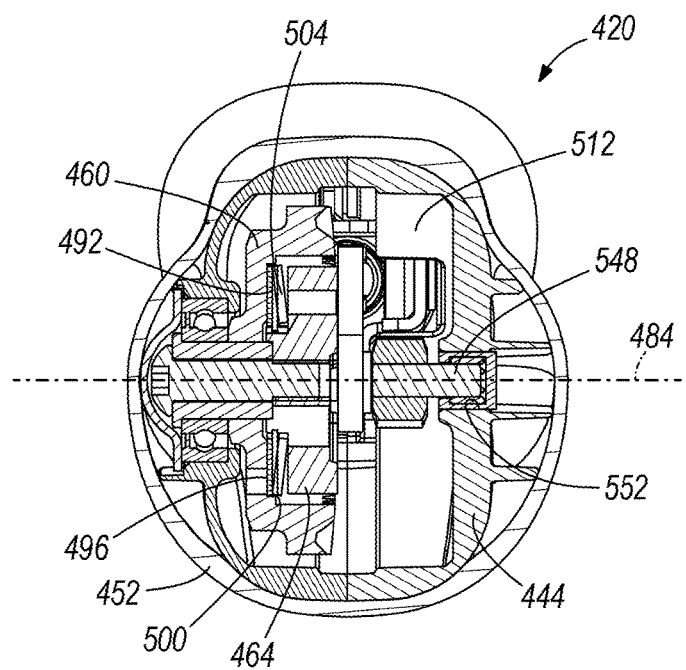
FIG. 14 is a cross-sectional view of the reciprocating saw taken along section line C-C of FIG. 12.

As shown in FIGS. 14 and 15, a clutch assembly 492 is positioned between the gear 460 and the hub 464 to selectively transmit drive force from the gear 460 to the hub 464 and to selectively allow relative movement between the gear 460 and the hub 464. The illustrated clutch assembly 492 is a slip-clutch that includes two clutch disks 496, 500 and a disk spring 504. If a load on the spindle 472 or on the motor 428 exceeds the force applied to the clutch disks 496, 500 by the disk spring 504, the clutch disks 496, 500 will slip relative to each other to absorb potential impacts on the drive mechanism 432.

Similar to the spindle 116, the illustrated spindle 472 reciprocates along a longitudinal axis 508 in an orbital or rocking cutting motion to drive a saw blade, or other tool element. As shown in FIGS. 12 and 15, a guide block 512 is coupled to an inner surface of the neck portion 444 to guide and support the spindle 472 during reciprocation. Rollers 516 are coupled to the spindle 472 and the connecting rod 468 by the pivot pin 488 to facilitate movement of the spindle 472 within the guide block 512. The illustrated guide block 512 is tilted relative to an axis 520 extending through the motor 428 such that the spindle axis 508 is not parallel to the motor axis 520. Reciprocating the spindle 472 along a slightly inclined path creates the orbital or rocking motion of the saw blade during cutting operations.

A bushing 524 also surrounds a portion of the spindle 472 to help guide the spindle 472 during reciprocation. The bushing 524 is positioned forward of the guide block 512 and is coupled to the housing assembly 424 by two pins 528 such that the bushing 524 may pivot relative to the housing assembly 424 about a pivot axis 530. The bushing 524 tilts to accommodate the non-linear orbital or rocking motion of the spindle 472. In the illustrated embodiment, a generally H-shaped seal 532 surrounds a portion of the bushing 524. The seal 532 is also shown in FIGS. 10 and 11, and may be substituted for the seal 180 shown in FIGS. 4-6. The illustrated seal 532 includes two spaced apart lips or legs 536, 540 and a cross-member 542 connecting the lips 536, 540 such that the seal 532 is integrally formed as a single piece. In the illustrated embodiment, the entire seal 532 is composed of an elastomeric material. In other embodiments, the lips 536, 540 may be composed of an elastomeric material and the cross-member may be composed of a different material (e.g., metal, plastic, etc.).

The lips 536, 540 extend radially from the bushing 524 and engage the inner surface of the housing assembly 424. When the bushing 524 pivots in either direction, both of the lips 536, 540 remain in engagement with the housing assembly 424 to seal the inner components of the drive mechanism 432. The lips 536, 540 are movable independently of each other to reduce drag as the bushing 524 is pivoted and the seal 532 is deformed.

As shown in FIG. 15, the drive mechanism 432 includes a counterweight 544 to help balance forces generated by the spindle 472 and the saw blade during reciprocation. Similar to the counterweight 204, the counterweight 544 is coupled to the connecting rod 468 via the crank pin 480 and includes a guide pin 548 extending axially away from the gear 460. As shown in FIG. 14, the guide pin 548 engages a corresponding recess 552 in the housing assembly 424. As the gear 460 rotates to drive the crank pin 480, the counterweight 544 is moved in a substantially opposite direction than the spindle 472 to counterbalance the spindle forces.

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. A reciprocating saw comprising:
a housing assembly including a housing neck portion and a casing, the housing neck portion defining an aperture and a recess adjacent the aperture, the casing at least partially covering the aperture;
a motor positioned within the housing assembly, the motor including a pinion;
a drive mechanism positioned within the housing assembly, the drive mechanism including a gear coupled to and driven by the pinion, a hub coupled to the gear for rotation with the gear about an axis, a spindle reciprocatable relative to the housing assembly, and a connecting rod extending between the hub and the spindle to transmit rotation of the hub into reciprocation of the spindle; and
a clutch assembly coupled to the drive mechanism to selectively transmit a drive force from the gear to the hub, the clutch assembly including
a first disk coupled to the gear,
a second disk coupled to the hub,
a biasing member positioned between the hub and the first disk to bias the first and second disks into frictional engagement with each other, and
a threaded fastener having a threaded portion and a head, the threaded fastener extending through the gear and threadably engaging the hub to couple the hub to the gear, wherein tightening the threaded fastener pulls the hub toward the gear to preload the biasing member;
wherein the first disk, the second disk, and the biasing member are positioned within an opening in the gear, and wherein the biasing member biases the first and second disks into the opening; and
wherein the recess of the housing neck portion receives the threaded portion of the threaded fastener, and wherein the head of the fastener is disposed along the axis beyond the recess in a direction toward the casing.

2. The reciprocating saw of claim 1, wherein the hub abuts an inner face of the opening when the threaded fastener is tightened such that the biasing member is preloaded up to a predetermined amount.

3. The reciprocating saw of claim 2, wherein the biasing member is preloaded up to 175 in·lbs.

4. The reciprocating saw of claim 2, wherein once the hub abuts the inner face of the opening, the threaded fastener is tightened to between 180 in·lbs and 225 in·lbs to secure the gear and the hub together.

5. The reciprocating saw of claim 1, wherein the first disk includes a plurality of radially-outwardly projecting splines that engage the gear to couple the first disk to the gear.

6. The reciprocating saw of claim 5, wherein the second disk includes a plurality of radially-inwardly projecting splines that engage the hub to couple the second disk to the hub.

7. The reciprocating saw of claim 1, wherein the biasing member includes a Belleville washer.

8. The reciprocating saw of claim 1, wherein the clutch assembly allows relative movement between the gear and the hub to absorb potential impacts on the drive mechanism.

9. A drive mechanism for a reciprocating saw, the drive mechanism comprising:
a motor including a pinion;
a gear coupled to and driven by the pinion;
a hub coupled to the gear for rotation with the gear;
a spindle reciprocatable relative to the motor;
a connecting rod extending between the hub and the spindle to transmit rotation of the hub into reciprocation of the spindle; and
a clutch assembly coupled between the gear and the hub to selectively transmit a drive force from the gear to the hub, the clutch assembly including
a first disk coupled to the gear,
a second disk coupled to the hub,
a biasing member positioned between the hub and the gear and in direct physical contact with the hub to bias the first and second disks into frictional engagement with each other,
a threaded fastener having a threaded portion and a head that defines a shoulder, the threaded fastener extending through the gear and threadably engaging the hub to couple the hub to the gear, wherein tightening the threaded fastener pulls the hub toward the gear to preload the biasing member, and
a bushing positioned about the threaded portion of the threaded fastener and between the shoulder and the hub;
wherein the bushing includes a first end that contacts the shoulder and a second end that contacts the hub.

10. The drive mechanism of claim 9, wherein the gear defines an opening, and wherein the hub, the first disk, the second disk, and the biasing member are positioned within the opening.

11. The drive mechanism of claim 10, wherein the hub abuts an inner face of the opening when the threaded fastener is tightened such that the biasing member is preloaded up to a predetermined amount.

12. The drive mechanism of claim 11, wherein the biasing member is preloaded up to 175 in·lbs.

13. The drive mechanism of claim 11, wherein once the hub abuts the inner face of the opening, the threaded fastener is tightened to between 180 in·lbs and 225 in·lbs to secure the gear and the hub together.

14. The drive mechanism of claim 9, wherein the first disk includes a plurality of radially-outwardly projecting splines that engage the gear to couple the first disk to the gear.

15. The drive mechanism of claim 14, wherein the second disk includes a plurality of radially-inwardly projecting splines that engage the hub to couple the second disk to the hub.

16. The drive mechanism of claim 9, wherein the biasing member includes a Belleville washer.

17. The drive mechanism of claim 9, wherein the clutch assembly allows relative movement between the gear and the hub to absorb potential impacts on the drive mechanism.

18. A reciprocating saw comprising:
a housing assembly including a housing neck portion and a casing, the housing neck portion defining an aperture and a recess adjacent the aperture, the casing at least partially covering the aperture;
a motor positioned within the housing assembly, the motor including a pinion;
a drive mechanism positioned within the housing assembly, the drive mechanism including a gear coupled to and driven by the pinion, a hub coupled to the gear for rotation with the gear about an axis, a spindle reciprocatable relative to the housing assembly, and a connecting rod extending between the hub and the spindle to transmit rotation of the hub into reciprocation of the spindle; and a clutch assembly coupled to the drive mechanism to selectively transmit a drive force from the gear to the hub, the clutch assembly including a first disk coupled to the gear, a second disk coupled to the hub, a biasing member positioned between the hub and the first disk to bias the first and second disks into frictional engagement with each other, a threaded fastener having a threaded portion and a head that defines a shoulder, the threaded fastener extending through the gear and threadably engaging the hub to couple the hub to the gear, wherein tightening the threaded fastener pulls the hub toward the gear to preload the biasing member, and a bushing positioned about the threaded portion of the threaded fastener and between the shoulder and the hub;

wherein the recess of the housing neck portion receives the threaded portion and the bushing, and wherein the head is disposed along the axis beyond the recess in a direction toward the casing.

19. The reciprocating saw of claim 18, wherein the bushing extends through the gear.

20. The reciprocating saw of claim 19, wherein the bushing extends through the aperture.

\* \* \* \* \*